Nov. 20, 1928.  W. I. HALLOCK  1,692,208
FOLDING TRAILER BOAT
Filed Jan. 5, 1928   2 Sheets-Sheet 1
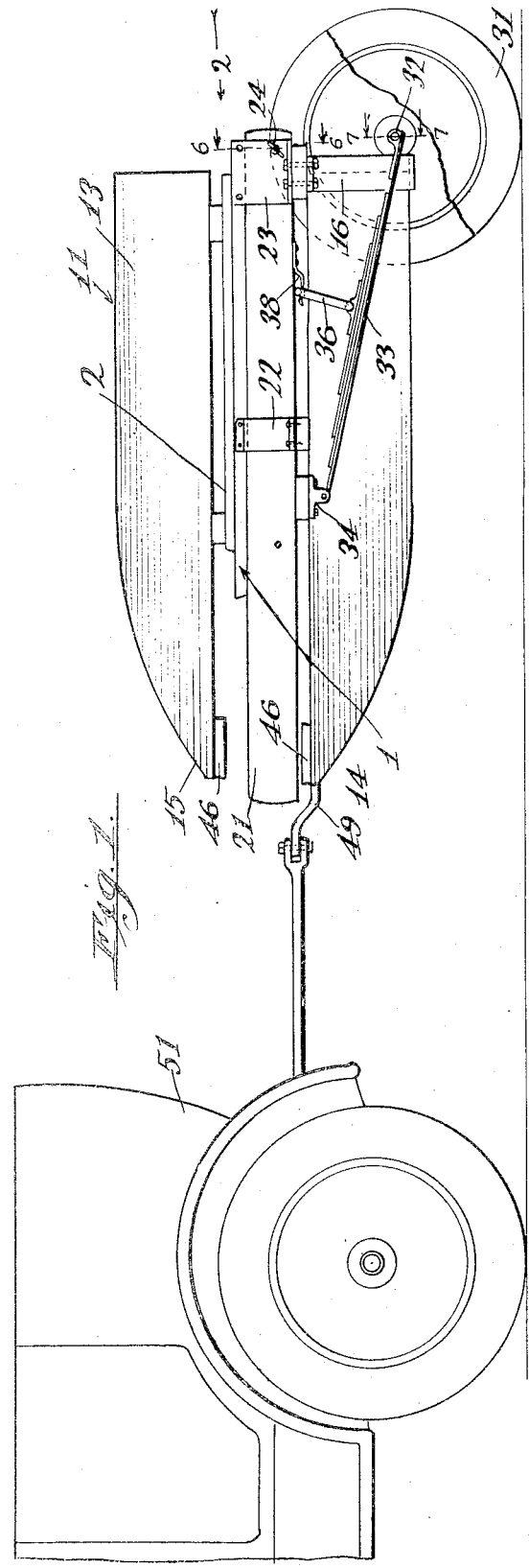
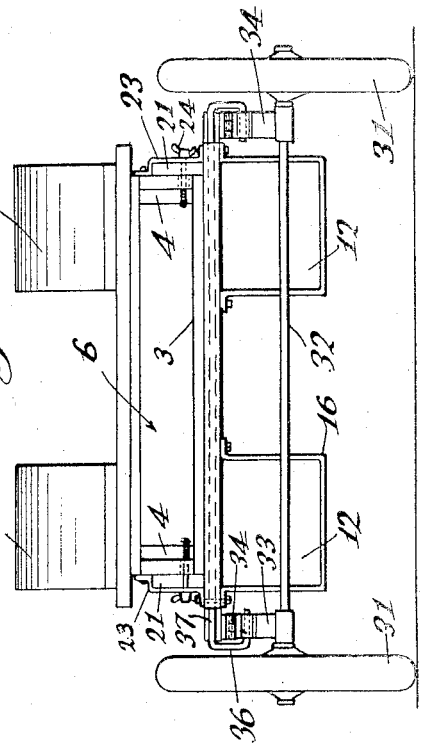
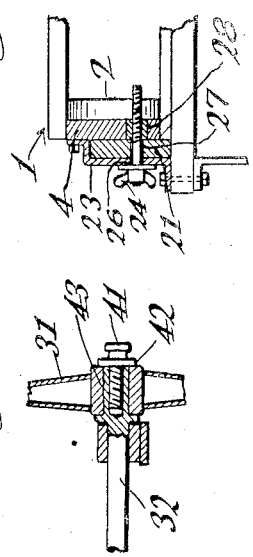
Inventor
William I. Hallock
by Hazard and Miller
Attorneys.

Nov. 20, 1928.   W. I. HALLOCK   1,692,208
FOLDING TRAILER BOAT
Filed Jan. 5, 1928   2 Sheets-Sheet 2
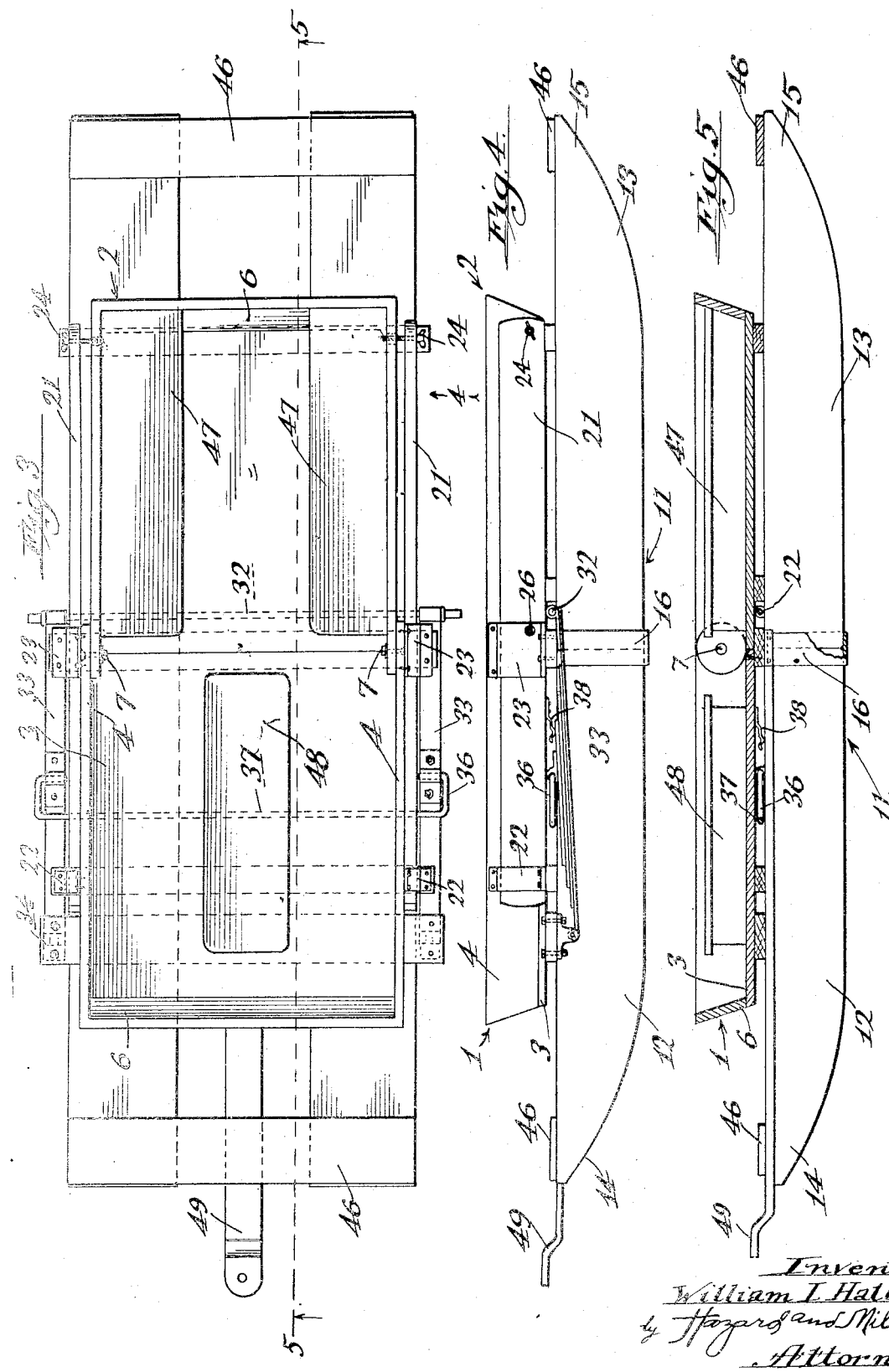
Inventor
William I. Hallock
by Hazard and Miller
Attorneys.

Patented Nov. 20, 1928.

1,692,208

UNITED STATES PATENT OFFICE.

WILLIAM I. HALLOCK, OF LOS ANGELES, CALIFORNIA.

FOLDING TRAILER BOAT.

Application filed January 5, 1928. Serial No. 244,640.

This invention relates to folding boats, and more especially to a folding boat provided with means for transporting the same behind a vehicle.

An object of the invention is to provide a boat comprising a plurality of sections adapted to be folded one into the other.

Another object of the invention is the provision of a folding boat provided with pontoons to insure the desired stability.

A further object is the provision of a folding boat, as above described, provided with wheels and a draw bar whereby the folded boat may be towed after an automobile or other vehicle.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a side elevation of the folded trailer boat of my invention, and a portion of an automobile behind which it is in position to be towed. A portion of one of the wheels is broken away to better reveal the structure.

Figure 2 is an end elevation of the trailer boat, the direction of view being indicated by the arrow 2 of Figure 1.

Figure 3 is a top plan view of the trailer boat in open relation.

Figure 4 is a side elevation of the open trailer boat, the direction of view being indicated by the arrow 4 of Figure 3.

Figure 5 is a longitudinal, vertical, sectional view of the open trailer boat, the plane of section being indicated by the line 5—5 of Figure 3.

Figure 6 is an enlarged, detailed, sectional view, showing a means for securing the locking bars in position. The plane of section is indicated by the line 6—6 of Figure 1.

Figure 7 is an enlarged, detailed, sectional view, showing the manner of mounting the wheels, the plane of section being indicated by the line 7—7 of Figure 1.

The trailer boat of my invention comprises a pair of cockpit sections 1 and 2, each comprising a bottom 3, side walls 4, and an end wall 6. The two cockpit sections 1 and 2 are of the same depth, but the section 2 is narrower than the section 1, so that it may be folded thereinto. For this purpose the ends of each of the sides 4 are extended beyond the open end of each cockpit section and are pivotally joined by aligned pivot pins 7, whereby the after cockpit section 2 may be optionally folded into the forward cockpit section 1 or extended to open relation.

Preferably a pair of pontoons 11 are secured to the under side of the cock pit to insure the necessary stability of the trailer boat while in the water. Each pontoon comprises a water-tight compartment 12 secured to the bottom of the forward cockpit section 1, and a similar air-tight compartment 13 secured to the bottom of the after cockpit section 2. The forward and after ends 14 and 15 respectively, of the pontoons 11 are rounded at the bottom, as clearly shown in Figures 4 and 5, while the abutting ends of the compartments 12 and 13 are square. To facilitate in retaining the compartments 12 and 13 in longitudinal, abutting alignment when in open relation, a strap 16 is carried by the forward cockpit section 1 and extends downwards therefrom in position to surround the joint between the two sections 12 and 13.

A locking bar 21 is slidably retained upon each side of the forward cockpit section 1 by means of guides 22 and 23. Each locking bar 21 is of sufficient length to permit it to extend aft when the body is in open relation, so that a bolt 24 may extend through an aperture adjacent the after end of each locking bar 21 and be threaded into the after end of the after cockpit section 2, thus securely retaining the cockpit and pontoons in open relation. When the boat is folded the locking bars 21 may be retained in withdrawn position by extending each bolt 24 through an aperture 26 in the guide 23 and an aperture 27 adjacent the end of the locking bar 21 and threading it into an aperture 28 in the wall 4 of the forward cockpit section 1.

Means for transporting the folded boat are provided in the form of a pair of wheels 31 mounted upon opposite ends of an axle 32. The axle 32 is positioned aft of the forward cockpit section 1 and air-tight compartment 12 by means of a spring 33 on each side of the cockpit section 1. The forward end of each of the springs 33 is pivotally mounted within a shackle 34 rigid with the bottom of the cockpit section 1. The weight of the trailer boat is supported upon the axle 32 and wheels 31 by means of a link 36 pivotally mounted upon each of the springs 33 at a point between the axle 32 and the point of attachment of the springs to the shackles 34. Preferably the links 36 are both formed of a single rod connected at their upper ends as at 37. It is to be understood that when the links 36 are swung aft above their pivotal mountings on the springs 33 they will be engaged within a spring clamp 38, and so positioned that the springs 33 will be swung downwards upon their pivotal mountings so that the axle 32 is dropped to the position shown in Figures 1 and 2. When it is desired to use the boat in the water, links 36 are disengaged from the clamps 38 and swung forwards, drawing the axle upwards to a position where it will be above the pontoon, when the after compartment 13 is swung to open position, as clearly shown in Figures 4 and 5.

To facilitate moving the boat through the water, it may be desirable to have the wheels so mounted upon the axle that they may be removed therefrom. For this purpose I have mounted the wheels 31 upon the axle 32 by means of a bolt 41 threaded into each end of the axle 32 and provided with a washer 42 of sufficient size to retain the wheel upon its journal 43. In order to prevent the liability of the bolts being unscrewed from the axle while the trailer boat is being towed, the bolt on the right side should be secured to the axle by a right-hand thread and that on the left side of the vehicle by a left-hand thread.

In order to suitably strengthen the entire structure a bracing strip 46 may be secured across the ends of the pontoons. A pair of seats 47 may be positioned in one of the cockpit sections and a single seat 48 in the other, so spaced that when the boat is folded the seat 48 will be disposed between the pair of seats 47. A draw bar 49 secured to the forward end of the trailer boat provides convenient means for attaching the trailer boat to the rear of an automobile 51 or other vehicle.

I claim:

1. In a trailer boat, a folding cockpit comprising forward and aft sections hingedly united, a pontoon comprising a water-tight compartment secured to the bottom of each cockpit section, a spring mounted on each side of one of the cockpit sections and extending aft thereof, an axle carried by said springs, wheels removably journaled upon said axle, and a link pivoted to each spring intermediate the axle and the point of attachment to the cockpit, said links being adapted to optionally be engaged by the bottom of said cockpit to lower the axle or to be released by the cockpit to permit withdrawing the axle above said pontoon.

2. In a trailer boat, a folding cockpit comprising forward and aft sections hingedly united, a pontoon comprising a water-tight compartment secured to each cockpit section, a spring mounted on each side of one of the cockpit sections and extending aft thereof, an axle carried by said springs, wheels removably journaled upon said axle, and a link pivoted to each spring intermediate the axle and the point of attachment to the cockpit, said links being adapted to optionally be engaged by the bottom of said cockpit to lower the axle or to be released by the cockpit to permit withdrawing the axle above said pontoon.

3. In a trailer boat, a folding cockpit comprising forward and aft sections hingedly united, a pontoon comprising a water-tight compartment secured to the bottom of each cockpit section, said pontoon sections being so disposed upon their respective cockpit sections as to be brought into abutting, longitudinal alignment when the cockpit is opened, a spring mounted on each side of one of the cockpit sections and extending aft thereof, an axle carried by said springs, wheels removably journaled upon said axle, and a link pivoted to each spring intermediate the axle and the point of attachment to the cockpit, said links being adapted to optionally be engaged by the bottom of said cockpit to lower the axle or to be released by the cockpit to permit withdrawing the axle above said pontoon.

4. In a trailer boat, a folding cockpit comprising forward and aft sections hingedly united, a pontoon comprising a water-tight compartment secured to the bottom of each cockpit section, said pontoon sections being so disposed upon their respective cockpit sections as to be brought into abutting, longitudinal alignment when the cockpit is opened, a spring mounted on each side of one of the cockpit sections and extending aft thereof, an axle carried by said springs, wheels removably journaled upon said axle, a link pivoted to each spring intermediate the axle and the point of attachment to the cockpit, said links being adapted to optionally be engaged by the bottom of said cockpit to lower the axle or to be released by the cockpit to permit withdrawing the axle above said pontoon, and means for locking said cockpit and pontoon in open relation.

5. In a trailer boat, a folding cockpit comprising forward and aft sections hingedly united, a pontoon comprising a water-tight compartment secured to the bottom of each cockpit section, said pontoon sections being so disposed upon their respective cockpit sections as to be brought into abutting, longitudinal alignment when the cockpit is opened, a spring mounted on each side of one of the cockpit sections and extending aft thereof, an axle carried by said springs, wheels removably journaled upon said axle, a link pivoted to each spring intermediate the axle and the point of attachment to the cockpit, said links being adapted to optionally be engaged by the bottom of said cockpit to lower the axle or to be released by the cockpit to permit withdrawing the axle above said pontoon, and a locking bar carried by one of said cockpit sections and slidable to engage the other section to lock the cockpit and pontoon in open relation.

6. In a trailer boat, a folding cockpit comprising forward and aft sections hingedly united, a pontoon comprising a water-tight compartment secured to the bottom of each cockpit section, said pontoon sections being so disposed upon their respective cockpit sections as to be brought into longitudinal abutment by opening said cockpit, a spring mounted on each side of the forward cockpit section, an axle carried by said spring aft of said cockpit section, wheels removably journaled upon said axle, a link pivoted to each spring intermediate the axle and the point of attachment to the cockpit, said links being adapted to optionally be engaged by the bottom of said cockpit to lower the axle or to be released by the cockpit to permit withdrawing the axle above said pontoon, and a draw bar secured to said trailer boat.

7. In a trailer boat, a folding cockpit comprising forward and aft sections hingedly united, one of said sections being smaller than the other to permit folding one inside the other, a pontoon comprising a water-tight compartment secured to the bottom of each cockpit section, said pontoon sections being so disposed upon their respective cockpit sections as to be brought into longitudinal abutment by opening said cockpit, a spring mounted on each side of the forward cockpit section, an axle carried by said spring aft of said cockpit section, wheels removably journaled upon said axle, a link pivoted to each spring intermediate the axle and the point of attachment to the cockpit, said links being adapted to optionally be engaged by the bottom of said cockpit to lower the axle or to be released by the cockpit to permit withdrawing the axle above said pontoon, and a draw bar secured to said trailer boat.

8. A trailer boat comprising a pair of sections hingedly mounted to optionally permit folding or extending, means for locking said boat in extended relation, a spring mounted on each side of one of said sections and extending aft thereof, an axle carried by the after end of said springs, wheels removably journaled upon said axle, and a link pivoted to each spring intermediate each axle and the point of attachment to the associated section, said links being adapted to optionally be engaged by the bottom of said section to lower the axle or to be released by said section to permit withdrawing the axle.

9. A trailer boat comprising a pair of sections hingedly united to optionally permit folding or extending, a spring mounted upon each side of one of said sections, an axle carried by said springs, wheels journaled upon said axle, and means for locking said sections in extended relation.

In testimony whereof I have signed my name to this specification.

WILLIAM I. HALLOCK.